March 29, 1966  F. R. SAVORY  3,242,714
HYRAULICALLY-OPERATED PRESS BRAKE CONSTRUCTION
Filed July 30, 1964  3 Sheets-Sheet 1

Inventor
Frederick R. Savory
Attorneys

March 29, 1966  F. R. SAVORY  3,242,714
HYRAULICALLY-OPERATED PRESS BRAKE CONSTRUCTION
Filed July 30, 1964  3 Sheets-Sheet 2
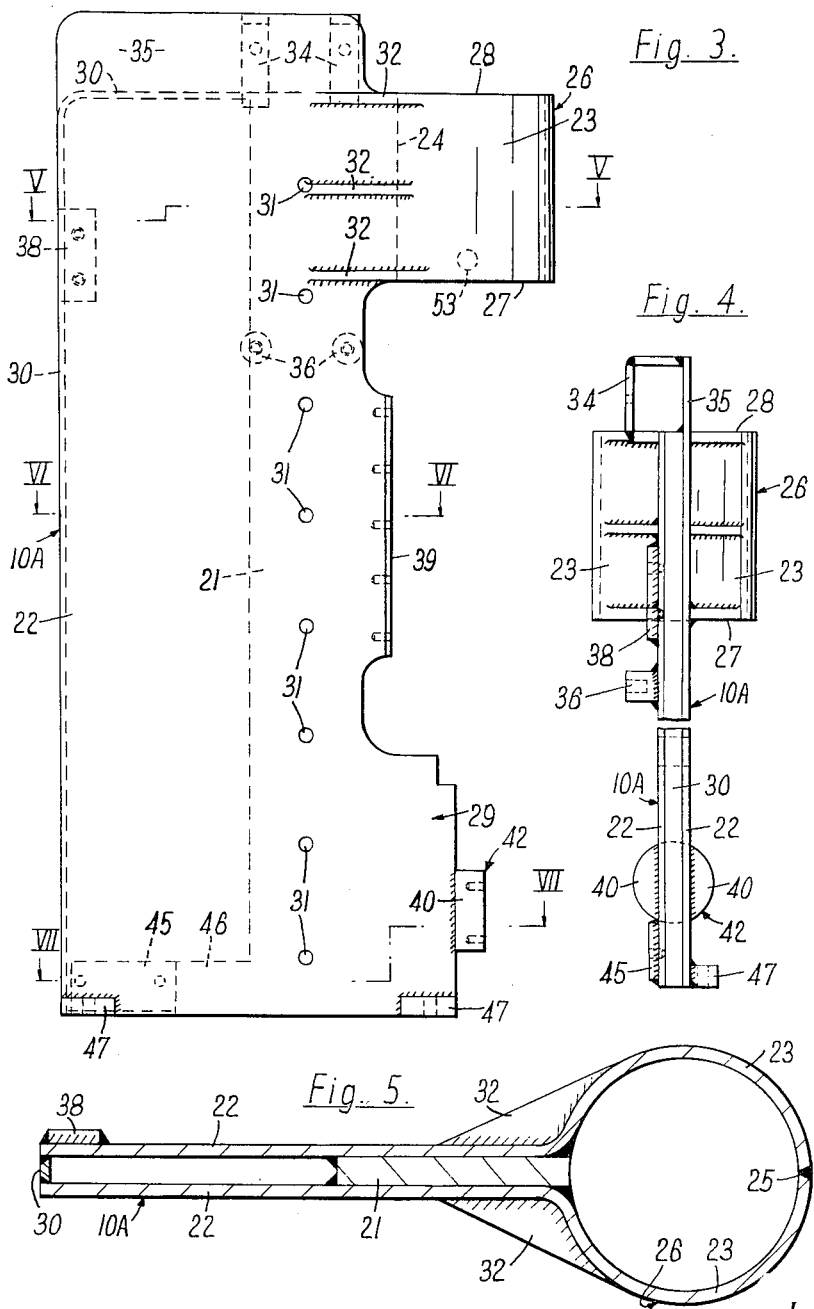

March 29, 1966   F. R. SAVORY   3,242,714
HYRAULICALLY-OPERATED PRESS BRAKE CONSTRUCTION
Filed July 30, 1964   3 Sheets-Sheet 3
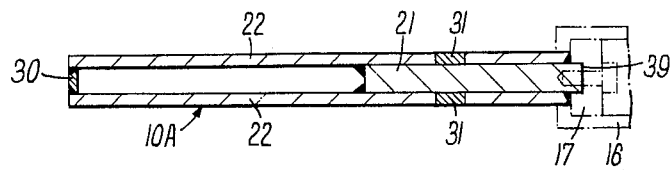
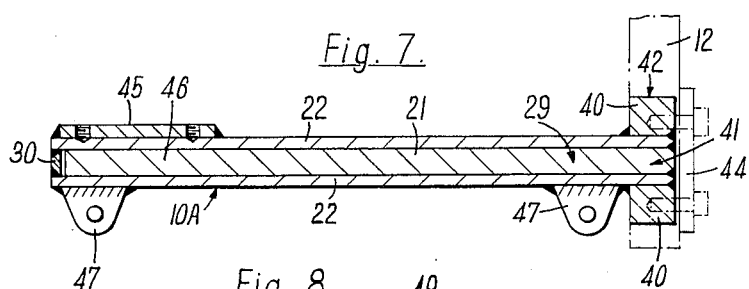
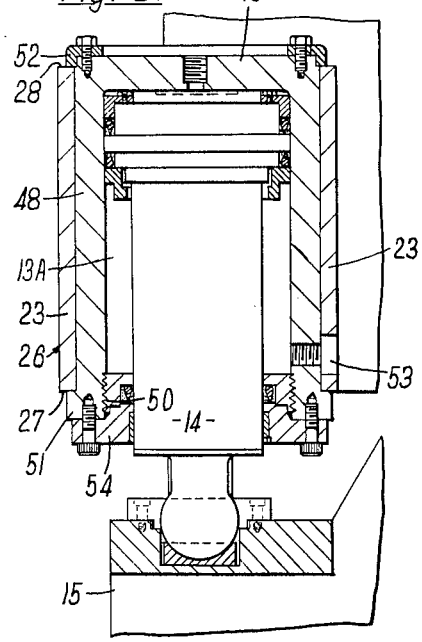
Inventor
Frederick R. Savory
By Watson, Cole, Grindle & Watson
Attorneys 3,242,714
HYDRAULICALLY-OPERATED PRESS
BRAKE CONSTRUCTION
Frederick R. Savory, Sutton-in-Ashfield, England, assignor to Steel Construction & Engineering Co. (Notts) Limited
Filed July 30, 1964, Ser. No. 386,224
Claims priority, application Great Britain, Aug. 9, 1963, 31,459/63
11 Claims. (Cl. 72—412)

This invention relates to hydraulically-operated press brakes or guillotines, more particularly of the type in which a pair of hydraulic rams are disposed one at or towards each side of the frame directly over the beam for the movable press brake tool or guillotine blade, with the piston rods of the rams extending downwardly for connection to the movable beam, the ram cylinders being provided in said frames connected across the bottom by a beam at the front for supporting the fixed press brake tool or guillotine blade and a tie-beam across the back, and connected above and behind the movable beam by a stiffening beam or beams, the latter usually also serving to support a motor and pump unit and a reservoir for the hydraulic fluid.

It has been usual for the side frames to be formed as separate castings with lower forward extensions for supporting the ends of the fixed beam and upper overhanging cylinder bores for the rams, the ends of the bores being closed by plates which are bolted round the ends of the bores. While the lower end-plates have to be sealed against only the comparatively low pressure required to effect the return stroke of the movable beam (i.e., to lift only the weight of that beam and associated parts), the upper end-plates have to be sealed against whatever pressure is required for any particular pressing or shearing operation, thus calling for a large number of bolts to secure the upper end-plates, which bolts may be so numerous and/or of such large diameter as to require the upper ends of the bores to be flanged—the end-plates then being of the same large diameter as the flanges—to accommodate all the bolts without weakening the cylinder walls or requiring thickening the cylinder walls as a whole. Whether flanged or not the castings are bulky and complicated.

It has been known to fabricate side frames of similar construction to cast ones as described above, by welding cylinders to the upper front edges of thick upright side plates the lower parts of which extend forwardly to support the fixed beam below the cylinders. However, the same considerations apply as regards the number of bolts required for securing the upper end-plates of the cylinders in sealed contact with the cylinders and as regards the likelihood of flanges being necessary.

The object of the invention is to provide fabricated side frames of more advantageous construction.

According to the present invention, a hydraulically-operated press brake or guillotine of the type referred to is provided with side frames each of which comprises an upright plate, a pair of plates flanking and secured to at least an upper portion of the upright plate and extending beyond one upright edge, the extensions being curved oppositely and secured together at their outer ends to form an upright cylindrical shell with open ends, a cylinder body having an open end and an integral closed end secured in the cylindrical shell with the closed end uppermost, and a rigid projection extending from a lower portion of the upright plate beyond the same upright edge as that beyond which the flanking plates extend.

Each cylinder body is preferably provided with an outward flange at its open end abutting the lower end of the cylindrical shell, for transmitting the working force from the cylinder to the side frame, the body being secured in the shell by bolting the flange to the shell or, preferably, by a cap bolted to the closed end of the cylinder body and projecting over the upper end of the shell.

Since the upper ends of the cylinder bodies are closed ends integral with the cylinder walls, the bolts securing the caps do not have to play any part in sealing the cylinder bodies and, therefore, need not be as numerous and/or of such large diameter as has previously been the case. They do not have to withstand more than the total weight of the cylinder bodies and lower end plates, the rams, and the movable beam and its associated parts. Furthermore, the bolts securing the caps to the cylinder bodies screw into blind tapped bores in the integral closed ends of the cylinder bodies; thus the upper ends of the walls of the cylinder bodies are not weakened by bolt holes.

Each upright plate may extend rearwardly (i.e., away from the edge carrying the cylinder) and be shaped to define the profile of the side frame, the flanking plates extending over the face of the upright plate as much as is necessary for effective securing of the flanking plates to the upright plate, e.g., by bolting or welding. The rigid projection extending from a lower portion of each upright plate, and intended to provide support for the fixed beam of the machine, may be an integral part of the upright plate.

Preferably, however, each upright plate serves as a spacer and stiffener for the flanking plates, which extend rearwardly and downwardly from the shell-forming extensions to define the profile of the side frame, the rear and upper edges of the flanking plates being connected by a closing strip or strips of a width equal to the thickness of the upright plate. The flanking plates may be bolted to the upright plate and to the closing strip or strips, or, preferably, the flanking plates may be welded to the upright plate and then the closing strip or strips welded betwen the flanking plates. Plug welds may also be provided between the flanking plates and the upright plates in holes in the portions of the flanking plates overlying the upright plate. The rigid projection extending from a lower portion of each upright plate, is preferably an integral part of the upright plate and may or may not be flanked by similar extensions of the flanking plates.

The fixed tool- or blade-carrying beam, the tie-beam, and the stiffening beam or beams may be bolted or welded between the side frames, which may be provided with lugs or feet on the bottom of their outside faces, drilled for receiving anchoring bolts; preferably, however, the ends of the fixed tool- or blade-carrying beam are provided with holes for location on bosses projecting from the projecting lower portions of the side frames, and secured by caps of larger dimensions (e.g., diameter) than the bosses bolted to the bosses.

The outer edges of the shell-forming extensions of the flanking plates may be welded together, but the provision of a single plate bent to form the cylindrical shell in one piece, with the ends of the plate flanking and secured (by bolting or welding) to the upright plate, is not precluded.

The caps on the top of the cylindrical shels may be discs with holes for bolting to the cylinder bodies, but they are preferably rings, so as to leave the centres of the closed ends of the cylinder bodies readily accessible for connection of pressure lines. Holes in the sides of the shells afford access for connection of pressure lines to the other end of the cylinders.

A press brake embodying the invention will now be described, by way of example only, with reference to the accompanying drawings, in which FIGURE 1 is a small scale front elevation of the complete press brake, but with pressure lines and controls omitted;

FIGURE 2 is an elevation of the left-hand side of FIGURE 1;

FIGURE 3 corresponds to FIGURE 2, to a larger scale, but shows the construction of the side frame only, the construction of the other side frame being similar, except for being of opposite hand and providing for mounting of a cylinder of smaller diameter;

FIGURE 4 is an elevation of the left-hand side of FIGURE 3;

FIGURES 5 to 7 are horizontal sections on the lines V—V, VI—VI and VII—VII respectively in FIGURE 3; and FIGURE 8 is a fragmentary vertical section on the lines VIII—VIII of FIGURE 2.

Figure 1:
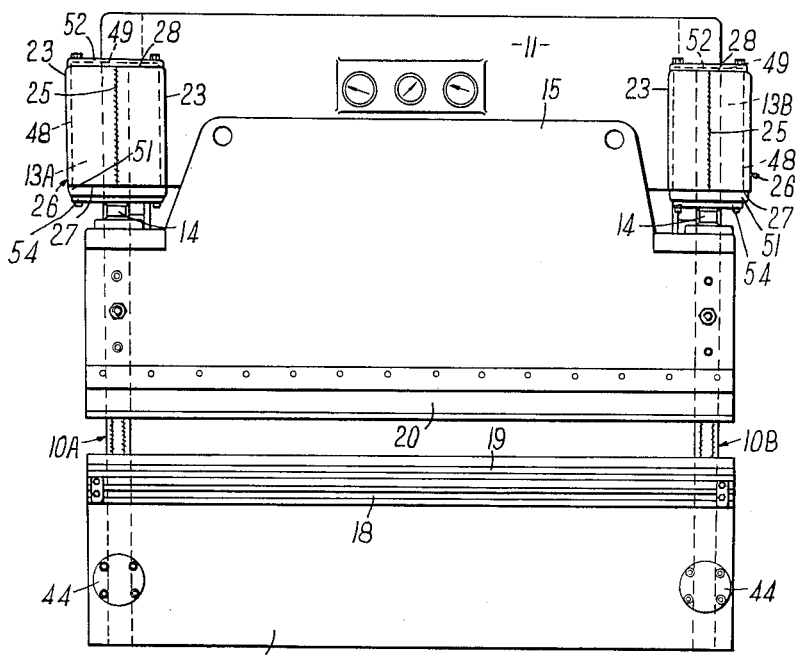
Figure 2:
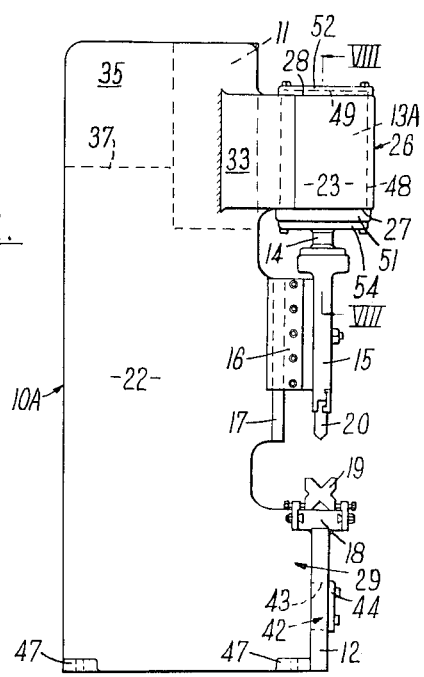

In FIGURE 1, a press brake is provided with side frames 10A, 10B connected rigidly together by a top beam 11 and a bottom beam 12, and supporting cylinders 13A, 13B the rams 14 of which carry a movable beam 15 provided with guides 16 (only one shown in FIGURE 2) vertically movable on slides 17 on the side frames. The bottom beam 12 has a bolster 18 welded along its top edge and supporting a removable fixed press tool 19, and the movable beam 15 carries a removable co-operating tool 20. It will be noted that the cylinder 13B is of slightly smaller diameter than the cylinder 13A but is otherwise constructionally similar, so that apart also from being of opposite hand, the frame 10B is the same as the frame 10A to which the further description will be confined, with reference to FIGURES 3 to 8.

Each side frame comprises a thick upright plate 21 and a pair of flanking plates 22, with extensions 23 beyond one upright edge 24 of the plate 21, the extensions being curved oppositely and welded together at 25 to form an upright cylindrical shell 26 with open ends 27, 28, and with a projection 29 consisting of both the upright plate and the flanking plates. Each upright plate serves as a spacer and stiffener for the flanking plates, which extend rearwardly and downwardly from the shell-forming extensions 23 to define the profile of the side frame, the rear and upper edges of the flanking plates being connected by a closing strip 30 of a width equal to the thickness of the upright plate. The flanking plates 22 are welded to the upright plate 21 and then the closing strip 30 welded between the flanking plates, as can be seen in FIGURES 5 to 7. Plug welds 31 are also provided between the flanking plates and the upright plate in holes in the portions of the flanking plates overlying the upright plate.

Gussets 32 stiffen the shell 26, and at least the outer ones may be bridged by a welded panel 33 (see FIGURE 2) to avoid any unnecessary exposed ledges, as well as adding to the clean appearance of the frame, the inside gussets being substantially covered by the end of the top beam 11, which is bolted to brackets 34 (welded to an extension 35 of the outer flanking plate 22) and bosses 36. The beam 11 houses the reservoir for the hydraulic system, the motor and pump of which (not shown) is carried by a shelf 37 (FIGURE 2) bolted to drilled and tapped plates 38 welded one to the inner flanking plate of each side frame, well towards the top of the otherwise open back of the press brake.

An exposed portion 39 of the upright plate 21 is drilled and tapped for bolts to secure the slide 17 for the guide 16 of the movable beam 15.

Cheeks 40 are welded to each side of a further projection 41 on the projecting portion 29 of the side frame and machined to form a circular boss 42, which projects through one of two holes 43 in the bottom beam 12, which is held in place by caps 44 of larger diameter bolted to the bosses on the side frames.

The lower rearward corners of the side frames are braced by a beam (not shown) bolted to a drilled and tapped plate 45 welded to the inner flanking plate of each side frame, where a tongue 46 on the upright plate 21 fills the gap between the flanking plates so as to increase the actual supporting area, the outer flanking plate of each side frame being provided with lugs 47 at the bottom corners, drilled for receiving anchor bolts.

Each cylinder body 48 has an integral closed end 49 and an open end 50, with an outward flange 51 at its open end abutting the lower end 27 of the cylindrical shell 26, for transmitting the working force from the cylinder to the side frame, the body being secured in the shell by a cap 52 bolted to the closed end 49 of the cylinder body and projecting over the upper end 28 of the shell. The cap 52 consists of a flanged ring, leaving the centre of the closed end 49 of the cylinder body readily accessible for connection of a pressure line (not shown). A hole 53 in the side of the shell 26 affords access for connection of a pressure line (also not shown) to the other end of the cylinder. The flange 51 also affords added thickness where the cylinder body 48 is provided with blind tapped holes for bolting of an end cap 54 to the open end 50 of the cylinder.

What I claim is:

1. A hydraulically-operated press brake of the type in which a pair of hydraulic rams are disposed one at or towards each side of the frame directly over the beam for the movable press brake tool, with the piston rods of the rams extending downwardly for connection to the movable beam, the ram cylinders being provided in side frames, said side frames connected across the bottom by a beam at the front for supporting the fixed press brake tool and a tie-beam across the back, and connected above and behind the movable beam by a stiffening beam or beams, side frames each comprising an upright plate, a pair of plates flanking and secured to at least an upper portion of the upright plate, extensions of the flanking plates extending beyond an upper portion of one upright edge of the upright plate and curved oppositely and secured together at their outer ends to form an upright cylindrical shell with open ends, a cylinder body having an open end and an integral closed end fitting in the cylindrical shell with the closed end uppermost, securing means for the cylinder body in the cylindrical shell, and a rigid projection extending from a lower portion of the upright plate beyond the same upright edge as that beyond which the flanking plates extend.

2. A hydraulically-operated press brake having side frames as in claim 1, wherein each cylinder body is provided with an outward flange at its open end abutting the lower end of the cylindrical shell, and a cap is bolted to the closed end of the cylinder body and projects over the upper end of the shell, so as to constitute the securing means for the cylinder body in the cylindrical shell.

3. A hydraulically-operated press brake having side frames as in claim 1, wherein the rigid projection extending from a lower portion of each upright plate is an integral part of the upright plate.

4. A hydraulically-operated press brake of the type in which a pair of hydraulic rams are disposed one at or towards each side of the frame directly over the beam for the movable press brake tool, with the piston rods of the rams extending downwardly for connection to the movable beam, the ram cylinders being provided in side frames, said side frames connected across the bottom by a beam at the front for supporting the fixed press brake tool and a tie-beam across the back, and connected above and behind the movable beam by a stiffening beam or beams, side frames each comprising an upright plate shaped to define the profile of the side frame, a pair of plates flanking and secured to an upper portion of the upright plate, extensions of the flanking plates extending beyond one upright edge of the upright plate and curved oppositely and secured together at their outer ends to form an upright cylindrical shell with open ends, a cylinder body having an open end and an integral closed end fitting in the cylindrical shell with the closed end uppermost, securing means for the cylinder body in the cylindrical shell, and an integral projection extending from a lower portion of the upright plate beyond the same upright edge as that beyond which the flanking plates extend.

5. A hydraulically-operated press brake having side frames as in claim 4, with the modification that a single plate is bent to form the cylindrical shell in one piece, with the ends of the plate flanking and secured to the upright plate.

6. A hydraulically-operated press brake of the type in which a pair of hydraulic rams are disposed one at or towards each side of the frame directly over the beam for the movable press brake tool, with the piston rods of the rams extending downwardly for connection to the movable beam, the ram cylinders being provided in side frames, said side frames connected across the bottom by a beam at the front for supporting the fixed press brake tool and a tie-beam across the back, and connected above and behind the movable beam by a stiffening beam or beams, side frames each comprising an upright plate, a pair of flanking plates spaced and stiffened by the upright plate and extending beyond one upright edge to define the profile of the side frame, extensions of the flanking plates extending beyond an upper portion of the other upright edge of the upright plate and curved oppositely and secured together at their outer ends to form an upright cylindrical shell with open ends, a cylinder body having an open end and an integral closed end fitting in the cylindrical shell with the closed end uppermost, securing means for the cylinder body in the cylindrical shell, at least one strip of a width equal to the thickness of the upright plate secured between and closing the rear and upper edges of the flanking plates, and an integral projection extending from a lower portion of the upright plate in the same direction as the cylindrical shell.

7. A hydraulically-operated press brake having side frames as in claim 6, wherein the flanking plates are welded to the upright plate and the closing strip welded between the flanking plates.

8. A hydraulically-operated press brake having side frames as in claim 6, wherein the projection of the upright plate is flanked by similar extensions of the flanking plates.

9. A hydraulically-operated press brake having side frames as in claim 6, wherein plug welds are provided between the flanking plates and the upright plates in holes in the portions of the flanking plates overlying the upright plate.

10. A hydraulically-operated press brake having side frames as in claim 6, wherein bosses project from the projecting lower portions of the upright plates, for location in holes near the ends of the fixed tool- or blade-carrying beam, and caps of larger dimensions than the bosses provided for bolting to the bosses.

11. A hydraulically-operated press brake having side frames as in claim 6, the side frames being provided with lugs on the bottom of their outside faces, drilled for receiving anchoring bolts.

References Cited by the Examiner
UNITED STATES PATENTS 2,169,113　8/1939　Sheppard _____ 72—412
2,781,844　2/1957　Pearson et al. _____ 83—624 X WILLIAM W. DYER, Jr., *Primary Examiner.*

F. T. YOST, *Examiner.*